United States Patent [19]
Ritter, Jr. et al.

[11] 3,862,828
[45] Jan. 28, 1975

[54] CONTROLLING GLASS SHEET BENDING FURNACE TEMPERATURES

[75] Inventors: George F. Ritter, Jr.; Donald D. Rahrig, both of Toledo, Ohio

[73] Assignee: Libbey-Owens-Ford Company, Toledo, Ohio

[22] Filed: Oct. 19, 1973

[21] Appl. No.: 407,896

[52] U.S. Cl. .................... 65/29, 65/107, 65/288, 65/356
[51] Int. Cl. .......................................... C03b 23/02
[58] Field of Search ............ 65/356, 355, 107, 288, 65/103, 29

[56] References Cited
UNITED STATES PATENTS

| | | | |
|---|---|---|---|
| 3,387,962 | 6/1968 | Whitmire | 65/107 X |
| 3,721,594 | 3/1973 | Tarnopol et al. | 65/107 X |

*Primary Examiner*—Arthur D. Kellogg
*Attorney, Agent, or Firm*—Collins, Oberlin & Darr

[57] ABSTRACT

Controlling temperatures and reducing distortion in glass bending furnaces by the provision of cooled roof areas therein.

9 Claims, 3 Drawing Figures

PATENTED JAN 28 1975  3,862,828

CONTROLLING GLASS SHEET BENDING FURNACE TEMPERATURES

BACKGROUND OF THE INVENTION

1. Field of the Invention

The present invention relates to the bending of sheets or plates of glass, and more particularly to the production of bent glass articles of improved quality by controlling temperatures in selected areas of the bending furnace.

2. Description of the Prior Art

The art of bending glass sheets and plates is, of course, an ancient one and in present-day commercial production, such bending is commonly performed either by gravity or pressure.

Perhaps the largest volume of bent glass production is in connection with the processing of plate and sheet glass into glazings for automotive use, and this is generally carried out in so-called continuous roller kilns or furnaces.

For example, flat glass sheets, cut to pattern, may be bent to curvatures desired in windows or windshields of automobiles by running them through a horizontal heating furnace over a series of conveying rollers; then, as each successive sheet reaches bending temperature, lifting it from the rolls on a bending mold and causing the heated sheet to bend into contact with the shaping surface of the mold, either by the forces of inertia and gravity, or by pressing it against a suitably shaped upper bending mold; and, immediately thereafter, returning the bent sheet to the roller conveyor and carrying it forwardly, either through an annealing lehr or a tempering apparatus, to the discharge end of the apparatus.

On the other hand, employing a similar furnace, the flat sheets to be bent may be placed on so-called outline type bending molds and the molds, with the sheets thereon, be supported on and carried forwardly on a series of conveyor rolls first through a heated area within which the temperature of the glass sheet is raised to a point where it will sink by gravity into contact with the shaping surface of the mold, and then through an annealing or tempering area within which the bent sheet is either gradually cooled or rapidly chilled to anneal or temper it.

However, with all such horizontal type roller bending furnaces it is common practice to introduce heat, usually by means of burners which may be gas or electric and of the direct or radiant type, through either or both the top or side walls and/or from beneath the path of the glass sheet, in the heating area of the furnace.

SUMMARY OF THE INVENTION

The present invention is based, first, on a recognition of the fact that, even when heat is introduced into conventional bending furnaces from the bottom only, the heat always rises to the top, with the result that the roofs of the furnaces reach a temperature considerably above the softening point of the glass being treated; and, second, on the discovery that some improvements in bent glass quality can be attained and certain troublesome defects can be corrected by cooling roof areas of the furnaces while the sheets are being bent therein.

Accordingly a primary object of this invention is to provide a method and apparatus for producing bent glass sheets of improved quality and to accurately predetermined curvatures.

Another object is to provide a method and apparatus for cooling furnace roof areas for that purpose.

Further objects and advantages of the invention will become apparent in the course of the following description, when taken in connection with the accompanying drawings.

BRIEF DESCRIPTION OF THE DRAWINGS

In the drawings, wherein like numerals refer to like parts throughout.

DESCRIPTION OF THE PREFERRED EMBODIMENTS

While the method and apparatus of the invention is not limited to use in the production of any one particular kind of bent glass article, it has proven to be particularly advantageous in the production of certain electrically heatable, bent glass backlights for automobiles, and will be specifically described in that connection here.

By way of background it should be understood that most modern day backlights in automobiles are single sheets of tempered glass; that it is becoming rather common to provide such backlights with lines of electrically conducting material through which sufficient current can be passed from the car battery to heat the glass for defogging and de-icing purposes; and that one way of providing the electrically conducting lines is to apply lines of metal frit flux in the form of a grid to a surface of the flat glass sheet that is to be processed into a backlight, and to then depend on the heat that is applied to the glass to bring it to bending temperature to also fuse the metal frit lines to the glass.

However the bending of these electrically heatable, or so-called "heated" backlights presents some rather serious problems. Thus, heated backlights that have to be given what is known in this art as a "reverse" bend, cannot be produced by the pressure or inertia gravity methods described above because that would require running the glass sheets with the grid lines of unfused metal frit down and in direct contact with the conveyor rolls, and this cannot be done. Similarly, such heated backlights cannot be successfully produced by the gravity method with the grid lines up, because in so bending them the grid lines face the roof of the furnace during heating, and this has been found to result in such serious transmitted distortion in the glass around the grid lines as to cause rejection of the finished bent backlight. Indeed, even heated backlights with conventional bends, run on regular gravity furnaces with the grid lines on the top side of the glass, have proved unsalable because of line distortion.

Now, however, we have discovered that any heated backlight can be bent by gravity, with metal frit grid lines on the upper surface of the glass sheet and facing the furnace roof, without objectionable distortion, by a controlled cooling of the roof area in accordance with this invention.

Figure 1:
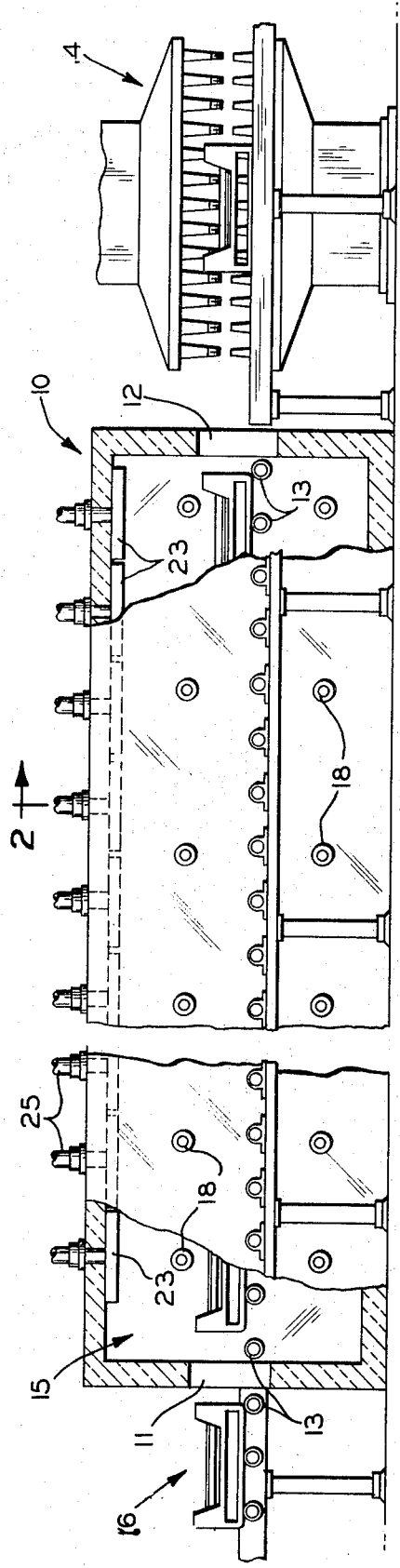
FIG. 1 is a side elevation of a bending furnace of the continuous type embodying the invention.
Figure 2:
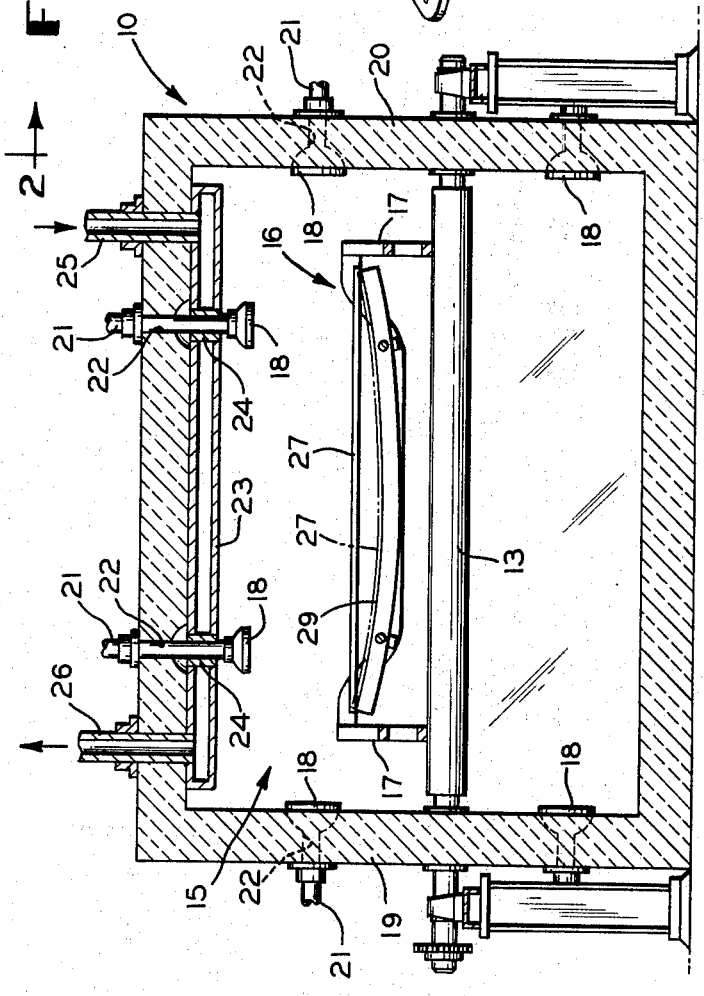
FIG. 2 is a transverse, sectional view taken substantially on the line 2—2 in FIG. 1.

More specifically, this has been done, in a preferred embodiment, by means of a relatively slight modification to a conventional, tunnel-type, roller bending furnace such as illustrated in FIGS. 1 and 2 of the accompanying drawings.

Bending furnaces of this general character commonly comprise an elongated, flat roofed, tunnel-like structure designated 10, having entrance and exit openings 11 and 12 respectively at their opposite ends, and a series of horizontally and transversely arranged conveyor rollers 13 extending therethrough. The furnace shown is intended for the production of bent-tempered glass lights or windows and so is equipped with a tempering device 14 which may be located either within or (as shown) just beyond and outside of the exit end of the furnace 10. Where it is not desired to temper the bent glass, the tempering device 14 can be replaced by an extension to the furnace enclosure of sufficient length to provide an adequate annealing zone.

In either event, however, the furnace 10 as shown serves as a heating zone within which flat glass sheets or plates to be bent are gradually heated to the softening point or bending temperature of the glass and, to this end, suitable heating means 18 are provided within the tunnel chamber 15 of the furnace as best shown in FIG. 2. In the illustrated embodiment the bending furnace is of the gravity type and so is equipped with a supply of bending molds 16, provided with horizontal side rails 17, adapted to be supported on and to ride over the conveyor rolls 13. The heating means 18 as shown are gas burners of the radiant type and, as also shown, may be located adjacent the opposite side walls 19 and 20 in the chamber 15, in the lower part of the chamber beneath the path of travel of the molds, and in the upper part of the chamber adjacent its roof, by passing fuel feed pipes 21 through furnace openings 22 and attaching the burners 18 thereto.

The bending furnace thus far described is generally conventional and known to the art. Ordinarily in the bending of glass sheets, a full complement of side wall, roof and under the mold burners (preferably adjustable) are employed. However, as indicated above, applicants have found that, regardless of burner pattern, the roof temperature of the furnace is always high. For example, in bending soda-lime-silica glass sheets (that generally speaking are considered to have a softening point of between 1,150° and 1,225° F.) in this type of furnace, with only the bottom or under the mold burners on, the heat rises so that the entire furnace roof will reach or exceed a temperature of 1,450° F., and even shielding every other mold will not bring the roof temperature down below 1,450° when the furnace is operating under a full load of molds. Nevertheless none of this would generally be considered objectionable because, as applicants have also learned, it is desirable to have a certain amount of heat from the top side in order to properly control bending.

Now, it was against this background that applicants decided to try the effect of their furnace roof cooling technique in the gravity bending of heated backlights with the grid lines up. To this end, stainless steel boxes 23 were mounted as shown in FIG. 2 and as close to the furnace roof as possible with provision, by way of passageways or sleeves 24 through which fuel pipes 21 can be passed to permit the attachment of roof burners 18 at strategic points.

In the initial trials six of the boxes 23 were installed, each with a 2½ inch inlet 25, through which cooling air was introduced at a velocity of 2,000 feet per minute, and a similarly sized outlet 26. Under operating conditions, with soda-lime-silica glass sheets, the temperature of the exhaust air was from 490° to 700° F., depending on the pattern of the roof burners attached below the boxes; the surface temperature of the boxes were from 1,300° to 1,350° F.; and the heated backlights bent with the grid lines up during the trials were graded as "excellent" for transmitted distortion.

However, the limited amount of cooling provided in the trials (the 20 boxes covered approximately 15 percent of the roof surface of the heating chamber) was only satisfactory for operating with a single mold and at a slow furnace speed. To permit full load operating conditions to be put against the heating chamber roof in a practical production line operation, a minimum of 80 per cent of the roof area is preferably cooled.

Figure 3:
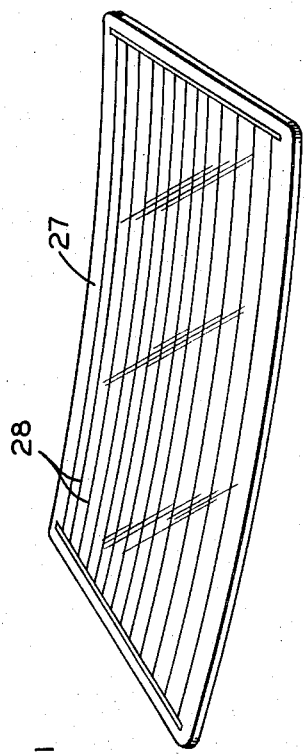
FIG. 3 is a perspective view of a flat sheet of glass pattern cut to backlight shape and provided with lines of metal frit on one surface thereof, preparatory to bending in accordance with the invention.

In producing bent backlights, for example, by the present invention, a succession of flat sheets of glass 27 that have been pattern cut to the required shape (FIG. 3), are provided on one surface with lines 28 of unfused metal frit applied in a grid pattern designed to furnish adequate heat for defrosting a backlight when an electric current is passed therethrough. A mixture of metal and frit particles in a suitable carrier is commonly employed for the purpose and may be deposited on the glass in a number of different ways such as by spraying or brushing through a template.

As they are lined, the flat glass sheets 27 are supported, with the grid side up, on molds 16 (as indicated in full lines in FIG. 2) and moved successively over rollers 13 into and through the entrance opening 11 (FIG. 1). Once in the furnace 10, the molds 16 are continuously conveyed by the rollers 13 from one end to the other of the heating chamber 15 which is of such length, and is so heated by the burners 18, that as the glass sheets 27 carried on the successive molds approach the exit end of the chamber they will have been heated to bending temperature and will sink by gravity into contact with the shaping surfaces 29 of the molds.

At the same time, however, heat in excess of that required to bend the glass, and which is normally present in the roof area of conventional bending furnaces, will be removed by the roof coolers of boxes 23, and this effectively eliminates transmitted distortion that would otherwise be set up in these circumstances around the grid lines in the finished bent heated backlight.

At the same time the successive bent heated backlights emerging from the exit opening of the furnace 10 will still be at the temperature necessary to either temper them by blasts of air directed against their opposite surfaces from the blastheads 14, or to permit them to be adequately annealed by passing them through a suitable annealing chamber (not shown).

It will be appreciated that the boxes 23 function to provide a relatively cool ceiling or, differently stated, to chill or cool a stratum of air lying above the glass sheets being bent and below the ceiling, in the heating chamber 15; that water, or other liquid, as well as air or other gaseous medium, may be employed in cooling the boxes 23, and that by reading the temperature of the fluid exhausting through the outlets 26 the velocity and/or temperature of the fluid entering through inlets 25 can be regulated to maintain a standard and predetermined roof or ceiling temperature within the heating chamber 15. Similarly, the cooling may be carried out in different ways and by different means than those specifically described here. Also the so-called bending molds, which are preferably of the outline type, and generally have contoured shaping surfaces as shown at 29 in FIG. 2, may also be shaped to serve merely as horizontal supporting frames for margins of the flat glass sheets while permitting their central portions to bend or sag into the frame opening.

Indeed, it is to be understood that the form of the invention herewith shown and described is to be taken as a preferred embodiment of the same, and that various changes in the shape, size and arrangement of parts may be resorted to without departing from the spirit of the invention.

We claim:

1. In a method of bending glass sheets wherein flat sheets of glass are supported and exposed within a heating and bending chamber to temperatures that approximate the softening point of the glass until said sheets sag by gravity to a desired curvature, the step of cooling the ceiling of said heating and bending chamber during said exposure.

2. A method as defined in claim 1 in which said cooling is performed by forcing air through a cooling area under the roof of said chamber, and said cooling is controlled by measuring the temperature of the air exiting from said area and regulating the velocity of the air being forced thereinto accordingly.

3. A method as defined in claim 1, in which said flat sheets are of soda-lime-silica glass having lines of unfused metal frit on the upper surface thereof, and said ceiling is cooled to a temperature below 1,450° F.

4. A method as defined in claim 1, in which said sheets are supported on outline type bending molds, said chamber is heated to approximately the softening point of said glass, and said sheets are exposed to said temperatures by moving them through said chamber.

5. Apparatus for bending glass sheets comprising a horizontal tunnel-type heating and bending chamber, means for conveying said sheets therethrough, means for heating said sheets to bending temperature during said conveying, and means for cooling the ceiling of said heating and bending chamber.

6. Apparatus as claimed in claim 5, in which said heating means include means adjacent said cooled ceiling of said chamber for directing heat downwardly toward said glass sheets.

7. Apparatus as claimed in claim 6, in which said heating means also includes means adjacent the side walls of and below the path of travel of the glass sheets in said chamber for directing heat toward said path.

8. Apparatus as claimed in claim 4, in which said cooling means comprises boxes located under the roof of said chamber, and means for introducing cooling fluid into and exhausting it from said boxes.

9. A method as defined in claim 1, in which said sheets are supported and exposed by passing a continuous line thereof through said heating and bending chamber, and the major portion of said ceiling is cooled during said exposure.

* * * * *